United States Patent
Hickerson

(12) 
(10) Patent No.: US 6,477,584 B1
(45) Date of Patent: *Nov. 5, 2002

(54) MESSAGE FIFO EMPTY EARLY WARNING METHOD

(75) Inventor: Roger Hickerson, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/823,298

(22) Filed: Mar. 21, 1997

(51) Int. Cl.[7] .................................................. G06F 9/46
(52) U.S. Cl. ........................... 709/314; 710/53; 710/56; 710/57
(58) Field of Search ................................. 395/680, 683; 709/300, 303, 314; 710/54, 57, 56, 53

(56) References Cited

U.S. PATENT DOCUMENTS

| | | | |
|---|---|---|---|
| 3,818,461 A | 6/1974 | Ward et al. .............. 340/172.5 |
| 4,125,870 A | 11/1978 | Suzuki et al. .............. 364/900 |
| 4,138,732 A | 2/1979 | Suzuki et al. .............. 364/900 |
| 4,272,819 A | 6/1981 | Katsumata et al. ......... 364/200 |
| 4,394,725 A | * 7/1983 | Bienvenu et al. .......... 709/106 |
| 4,571,671 A | 2/1986 | Burns et al. ................ 364/200 |
| 4,783,730 A | 11/1988 | Fischer ....................... 364/200 |
| 4,821,185 A | 4/1989 | Esposito ..................... 364/200 |
| 4,860,193 A | 8/1989 | Bentley et al. ............. 364/200 |
| 4,866,609 A | * 9/1989 | Calta et al. ................. 364/200 |

(List continued on next page.)

OTHER PUBLICATIONS

Druschel, Peter et al. "Experiences with a High Speed Network Adapter".*
Martin, Richard P. "Workstations".*
Orfali, Robert. "Client/Server Surival Guide".*
Liu, Lok Tin, David E. Culler. "Evaluation of the Intel Paragon on Active Message communication." Proceedings of Intel Supercomputer Users Group conference, pp. 1–21, Jun. 1995.*
(IBM) "Queueing and Serialization Method for Software Pipes on Large Scale Operating Systems" IBM Technical Disclosures Bullentine, vol. 39, Dec. 1996.*
(Stevens) Stevens, W. Richard. "UNIX Network Programming". p. 105, 1990.*
Druschel et al.; Experienced with a High–Speed Network Adaptor: A Software Perspective; pp. 2–13.
Martin, Richard P; Workstations; pp. 1–19.
Orfali; Client/Server Survival Guide; 1994; pp. 240–245.

Primary Examiner—St. John Courtney, III
Assistant Examiner—Lewis A. Bullock, Jr.
(74) Attorney, Agent, or Firm—Carstens, Yee & Cahoon, LLP

(57) ABSTRACT

A method of insuring continuous processing of messages from a Work FIFO in a message passing interface between a requesting module and a receiving module. Each module has access to two queues in the message passing interface, and each queue has a Work FIFO for containing message frames to be processed and a Free FIFO for containing empty message frames. The method includes a step of monitoring the number of free messages in the Free FIFO of the receiving module. When that number falls below a selectable early warning level, the receiving module is alerted. The receiving module then sends an early warning level signal to the requesting module, and additional free messages are posted to the Free FIFO of the receiving module. This posting of additional free messages allows the continued processing, by the receiving module, of messages from the receiving module work FIFO. The requesting module then has a continuous supply of free messages in the receiving module Free FIFO, and the receiving module is assured of having at least one free message in the FREE FIFO to send the early warning signal to the requesting module.

11 Claims, 2 Drawing Sheets

U.S. PATENT DOCUMENTS

| | | | |
|---|---|---|---|
| 4,914,653 A | * 4/1990 | Bishop et al. | 340/825.5 |
| 4,956,771 A | 9/1990 | Neustaedter | 364/200 |
| 4,958,277 A | 9/1990 | Hill et al. | 364/200 |
| 5,003,463 A | 3/1991 | Coyle et al. | 364/200 |
| 5,072,420 A | 12/1991 | Conley et al. | 395/425 |
| 5,175,818 A | 12/1992 | Kunimoto et al. | 395/200 |
| 5,197,128 A | 3/1993 | Campbell et al. | 395/275 |
| 5,280,584 A | * 1/1994 | Caesar et al. | 395/250 |
| 5,333,269 A | * 7/1994 | Calvignac et al. | 709/215 |
| 5,371,850 A | * 12/1994 | Belsan et al. | 709/314 |
| 5,428,766 A | * 6/1995 | Seaman | 709/215 |
| 5,434,872 A | 7/1995 | Peterson et al. | 371/57.1 |
| 5,434,892 A | 7/1995 | Dike et al. | 375/377 |
| 5,434,975 A | * 7/1995 | Allen | 709/107 |
| 5,473,756 A | * 12/1995 | Traylor | 710/57 |
| 5,517,662 A | 5/1996 | Coleman et al. | 395/800 |
| 5,546,546 A | 8/1996 | Bell et al. | 395/292 |
| 5,561,807 A | * 10/1996 | Verplanken et al. | 709/217 |
| 5,583,995 A | 12/1996 | Gardner et al. | 395/200.09 |
| 5,617,537 A | * 4/1997 | Yamada et al. | 709/214 |
| 5,640,565 A | 6/1997 | Dickinson | 395/683 |
| 5,682,554 A | * 10/1997 | Harrell | 395/877 |
| 5,764,915 A | 6/1998 | Heimsoth et al. | 395/200.57 |
| 5,790,789 A | 8/1998 | Suarez | 395/200.32 |
| 5,822,300 A | * 10/1998 | Johnson et al. | 370/229 |
| 5,892,979 A | * 4/1999 | Shiraki et al. | 395/872 |
| 5,925,099 A | * 7/1999 | Futral et al. | 709/200 |
| 6,134,619 A | * 10/2000 | Futral et al. | 709/204 |
| 6,212,543 B1 | * 4/2001 | Futral | 707/511 |
| 6,385,658 B2 | * 5/2002 | Harter et al. | 709/312 |
| 6,401,147 B1 | * 6/2002 | Sang et al. | 710/14 |

\* cited by examiner

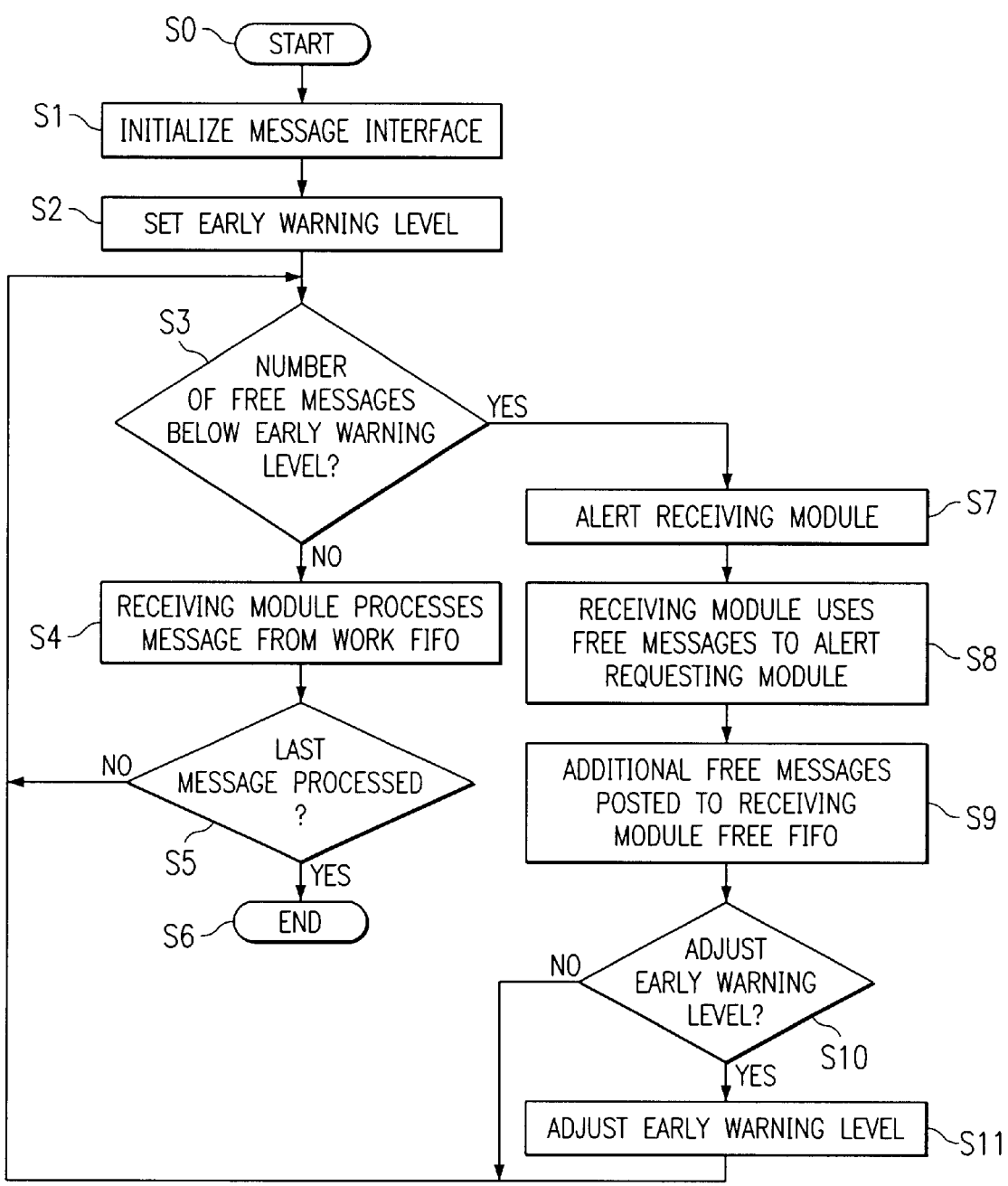

MESSAGE FIFO EMPTY EARLY WARNING METHOD

BACKGROUND OF THE INVENTION

1. Field of the Invention

The present invention relates to message passing interfaces between either hardware or software modules. More specifically, the present invention relates to a method for remedying a condition wherein a number of available free messages has dropped below a predetermined level.

2. Previous Art

Modules often are required to communicate with other modules. For example, a host software module is often required to communicate with other software modules, such as an I/O peripheral software driver, or another host software module. As modern applications require increasing amounts of data to be transferred efficiently, at a continuous rate and in a predictable manner, the demands placed on such software modules increases. Various message passing protocols have been developed to facilitate communication between modules, both to facilitate portability of software module across operating systems and to contribute to the development of intelligent, distributed I/O processing. By utilizing a standard message passing interface, modules can be designed independent of both the underlying bus architecture and the specific operating system used. Moreover, by imbuing the modules with added intelligence and autonomy, the burden of the other modules, memory and system bus can be lessened, thus freeing them for other tasks. A message passing protocol can be thought of as an intermediary separating one module from another module which facilitates the exchange of data and control information. A specific implementation of such a message passing protocol includes one inbound and one outbound logical queue for each module of a pair of modules. The inbound logical queue of each module receives all messages targeted for that module, whereas the outbound queue of each module receives all messages processed by that module. The inbound queue of one module is the outbound queue of the other module.

The inbound and outbound queues would each be implemented as a pair of first-in-first-out registers, or FIFOs. Each of the inbound and outbound queues would have a Work FIFO where message frames are posted for processing and a Free FIFO that contains empty message frames that are available for use. A Requesting Module removes a message from the Free FIFO, processes the message, and then posts the message on the Work FIFO. The Receiving Module retrieves the message from the Work FIFO, processes the message and places the message on the Free FIFO.

During initialization of such a message interface, free messages are posted in the Free FIFO. When the Requesting Module removes messages from the Free FIFO, the number of free messages in the free FIFO is reduced. As the Receiving Module processes messages retrieved from the Work FIFO, free messages are posted on the Free FIFO. If the Receiving Module is slower than the Requesting Module in processing messages, free messages will become exhausted in the Free FIFO, and the Requesting Module will be forced to stall, waiting on the availability of free messages in the Free FIFO. Moreover, since there are no free messages left in the Free FIFO at that time, the Receiving Module will not be able to appropriate one to send a message to the Requesting Module to the effect that the Free FIFO is empty. The system constituted by the Requesting and the Receiving Module is now deadlocked, because the Requesting Module can no longer post messages to the Receiving Module's work FIFO, as there are no free messages available to process. Within the context of message passing interfaces, this situation is known as message starvation. The Receiving Module, also lacking free messages because all of the messages reside on the work FIFO, is unable to communicate with the Requesting Module until it has finished processing messages in its Work FIFO and has posted additional Free messages on the Free FIFO.

There exists a need, therefore, for a method which would alleviate the problems inherent in such message passing systems. In particular, there exists a long felt need for a solution to the problems of deadlock and free message starvation between pairs of modules separated by such a message passing interface.

Previous attempts to solve similar problems have depended upon additional circuitry to regulate the transfer rates of data between the software modules, or have relied upon a scheme which prioritizes requests according to some pre-established hierarchy. An example of the former approach is disclosed in U.S. Pat. No. 5,434,892 to Dyke et al. In Dyke et al., to account for different data transfer rates, a throttle circuit is interposed between two devices to throttle the data transmission between a buffer and a register circuit upon receipt of a Buffer Almost Empty Signal, and to stop data transmission upon receipt of a Buffer Empty signal. This method, however, is not optimal, as it tends to actively slow the system down to match the speed of the slowest member of the system, in order to prevent the transmission of invalid data retrieved from an empty buffer.

Another example is disclosed in U.S. Pat. No. 4,272,819 to Katsumata et al. In Katsumata, communication between a host and an I/O subsystem is achieved by means of communication queues, each of the host and I/O subsystems having the ability to enqueue and to dequeue information onto the communication queues. When either the host or I/O subsystem issues an enqueue command, the queue element length is compared with the remaining space available in the queue. If the comparison satisfies a given criterion, a queue overflow state or a queue usable state is detected. When a queue is in an overflow state, it requests a queue usable interruption to a processor, when the remaining space in the queue increases. If this request is accepted, the queue is released from its overflow condition. Thus, communication between the host and the I/O subsystem is interrupted until the queue is released from its overflow condition.

What is desired, however, is to prevent the communication between a pair of software modules, such as a host and an I/O subsystem, from being interrupted, even temporarily.

What is also desired is a method of assuring continued processing of messages, even when one module is slower than the other, without throttling down one module to the rate of the slowest message processor.

What is also desired is a method of avoiding deadlock and free message starvation problems that can occur in message passing interfaces between modules, such as between individual I/O drivers in an operating system.

SUMMARY OF THE INVENTION

It is an object of this invention, therefore, to provide a method for assuring the continuous processing of messages in a message passing interface, even when one module of a pair of modules is slower in processing messages than the other module of the pair.

It is an additional object of this invention to prevent the message passing between a pair of modules from being interrupted when a supply of free messages for processing is exhausted.

In accordance with the above objects and those that will be mentioned and will become apparent below, in a message passing interface between a requesting module and a receiving module, each module having access to two queues in the message passing interface, each queue having a Work FIFO for containing message frames to be processed and a Free FIFO for containing empty message frames, a preferred embodiment of the present inventive method of assuring continuous processing of messages from the Work FIFO comprises the steps of:

monitoring a number of free messages in the Free FIFO;

determining when the number of free messages falls below a selectively determined early warning level;

alerting the receiving module when the number of free messages falls below the early warning level;

sending, by the receiving module, an early warning level signal to the requesting module;

posting additional free messages to the Free FIFO; and processing, by the receiving module, of messages from the work FIFO, whereby the requesting module is assured of a continuous supply of free messages in the Free FIFO, and the receiving module is assured of having at least one free message in the FREE FIFO available to send the early warning signal to the requesting FIFO.

According to an exemplary embodiment of the present invention, the value of the selectively determined early warning level is determined during initialization of the message interface, to a value between zero and a number of free messages to be posted on the free FIFO.

According to another exemplary embodiment of the present invention, the selectively determined early warning level is adjusted as additional free messages are posted on the Free FIFO.

According to another preferred embodiment, in a message passing interface between a requesting module and a receiving module, each module having access to two queues in the message passing interface, having a Work FIFO for containing message frames to be processed and a Free FIFO for containing free messages, a method of preventing the Free FIFO from running out of free messages comprises the steps of:

monitoring a number of free messages in the Free FIFO;

sending an early warning level signal to the requesting module when the number of free messages in the Free FIFO falls below an early warning level; and posting additional free messages to the Free FIFO, whereby the receiving module has at least one free message to send the early warning level signal to the requesting module, and the receiving module uses the additional free messages to process messages from the Work FIFO.

According to an exemplary embodiment of the present invention, the value of the selectively determined early warning level is determined during initialization of the message interface, to a value between zero and a number of free messages to be posted on the Free FIFO.

According to an exemplary embodiment of the present invention, the selectively determined early warning level is adjusted as the additional free messages are posted on the Free FIFO.

According to yet another preferred embodiment, a method of preventing free message starvation in a message passing interface between a requesting module and a receiving module, each module having access to two queues in the message passing interface each queue having a Work FIFO for containing message frames to be processed and a Free FIFO for containing free messages, comprises the steps of:

detecting a number of free messages stored in the Free FIFO;

sending an early warning level signal to the receiving module when the detected number falls below an early warning level, the early warning level being selected to be greater than a FIFO empty level and less than a FIFO full level;

utilizing at least one remaining free message in the Free FIFO to alert the requesting module of a low free message status, and posting additional free messages to the Free FIFO, whereby the receiving module has free messages available to continue processing messages from the Work FIFO.

According to an exemplary embodiment, the value of the selectively determined early warning level is determined during initialization of the message interface.

According to another exemplary embodiment, the value of the early warning level is adjusted after the additional free messages are posted on the Free FIFO.

It is an advantage of this invention to prevent the problems of deadlock and free message starvation present in a message passing interface between modules.

It is another advantage of the present invention to address the particular problem presented in a message passing interface between individual I/O software drivers in an operating system.

BRIEF DESCRIPTION OF THE DRAWING

For a further understanding of the objects and advantages of the present invention, reference should be had to the following detailed description, taken in conjunction with the accompanying drawing, wherein:

FIG. 3 is a flow chart illustrating the message FIFO early warning method according to the present invention.

DETAILED DESCRIPTION OF THE INVENTION

Figure 1:
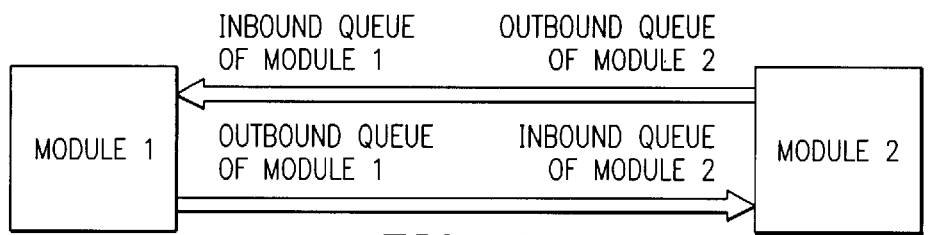
FIG. 1 is a diagram showing the inbound and outbound queues of a message passing interface between two modules.

FIG. 1 is a block diagram showing the inbound and outbound queues of a message passing interface between modules. FIG. 1 shows a module 1 and a module 2, and a message passing interface consisting of two queues including one outbound and one inbound queue for each of the modules. As is apparent in FIG. 1, the inbound queue of module 1 is the outbound queue of module 2. Likewise, the outbound queue of module 1 is the inbound queue of module 2. The inbound queue of module 1 contains messages targeted for module 1, whereas the outbound queue of module 1 contains the messages processed by module 1. Similarly, the inbound queue of module 2 contains messages targeted for module 2, whereas the outbound queue of module 2 contains the messages processed by module 2.

Figure 2:
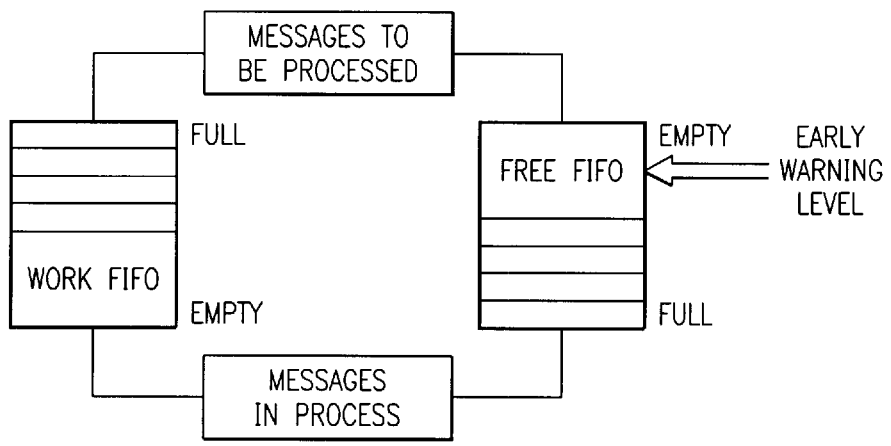
FIG. 2 is a block diagram of the FIFOs with which the early warning indication method according to the present invention is implemented.

FIG. 2 shows a logical diagram of the method of the message FIFO early warning indication according to the present invention. The inbound and outbound queues shown in FIG. 1 are each implemented as a pair of FIFOs as shown in FIG. 2: a Work FIFO where message frames are posted for processing, and a Free FIFO that contains empty message frames that are available to use. Each FIFO contains a variable number of messages which varies between FIFO EMPTY and FIFO FULL. The Free FIFO sends messages to be processed to the Work FIFO, who then processes these messages and returns them after processing to the Free FIFO, in the manner shown in FIG. 2.

Figure 4:
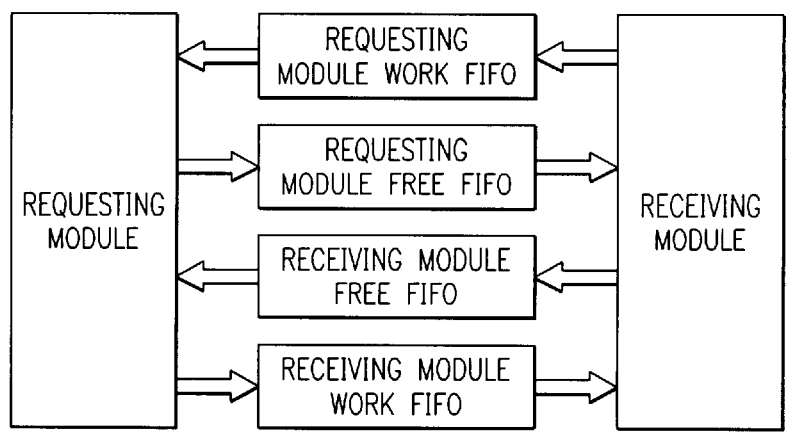
FIG. 4 is a diagram showing the message FIFOs within the queues of the message passing interface.

FIG. 4 shows the two queues in the message passing interface between the two modules from the perspective of the receiving module. When the receiving module sends a message to the requesting module, the receiving module retrieves a message frame from the requesting module's free FIFO and places the used message frame onto the requesting module's work FIFO. When the receiving module receives a message from the requesting module, the receiving module retrieves a message from the receiving module's work FIFO, processes the message, and places the free message onto the receiving module's free FIFO. The receiving module considers the requesting module's work FIFO as the outbound queue from the perspective of the receiving module, as explained with respect to FIG. 1. Likewise, the requesting module considers the receiving module's work FIFO as the inbound queue from the perspective of the receiving module, as explained with respect to FIG. 1.

In operation, the requesting module (either of the modules 1 and 2) removes a message from the Free FIFO, processes the message, then posts the message on the Work FIFO. The receiving module (the other one of the modules 1 and 2) retrieves the message from the Work FIFO, processes the message, and places the message on the Free FIFO. The message FIFO early warning indication method according to the present invention monitors the number of free messages remaining in the Free FIFO, and alerts the receiving FIFO when the number of free messages therein is less than a selectably predetermined early warning level. When the alert is received by the receiving module, the receiving module will have free messages available to alert the requesting module of the low free message condition. Additional messages can then be posted on the Free FIFO, allowing the receiving module to continue to process messages from the Work FIFO. The value of the early warning level is set during initialization of the message passing interface, to a value between FIFO EMPTY, or zero, and the number of free messages to be posted on the Free FIFO.

FIG. 3 shows a flow diagram of the message FIFO early warning method according to the present invention. The method starts with step S0. In step S1, the message passing interface is initialized, and free messages are posted to the Free FIFO. The early warning level is set in step S2. In step S3, it is determined whether the current number of free messages is below the preset early warning level. Since this is the first iteration, and a number of free messages were just posted to the Free FIFO, the result of the comparison between the preset early warning level and the actual number of free messages available in the Free FIFO, will result in a "no" decision in step S3. In step S4, the receiving module processes a message from the Work FIFO. If the message just processed was the last message according to S5, the method ends in step S6. If not, the iteration returns to entry point "A", whereupon Step S3 is repeated. In step S3, the current number of Free messages in the Free FIFO is again compared with the preset early warning level. If the number of remaining free messages in the Free FIFO is below the early warning level, the method proceeds to step S7. If, however, the number of free messages remaining in the Free FIFO is still higher than the preset early warning level, the method continues as described earlier, beginning with step S4.

In step S7, the receiving module is alerted that the number of free messages remaining in the Free FIFO has fallen below the value of the preset early warning level. Using one or more of the remaining free messages in the Free FIFO, the receiving module alerts the requesting module of the low free messages status of the Free FIFO. This assumes that the value of the early warning level has been set above FIFO EMPTY. If the early warning level has been set to the FIFO EMPTY level, there will be no more free messages in the Free FIFO available for use to alert the requesting module of the low free message condition of the Free FIFO. Additional free messages are then posted to the Free FIFO, in step S9. In step S10, a decision is made whether to adjust the value of the early warning level, to account for the increased number of free messages present in the interface. If a decision is made not to adjust the value of the early warning level ("no" branch), the method loops back to entry point "A", whereupon it is decided whether the number of free messages remaining exceeds the early warning level, in step S3. If it is decided to adjust the value of the early warning level to account for the free messages added in step S9, the value of the early warning level is adjusted in step S11. The method then returns to entry point "A", and step S3 is again repeated, until the last message is processed in step S4, and the end S6 is reached.

Free message starvation problems are thus avoided. By monitoring the supply of free messages in the Work FIFO, additional free messages can be posted to the Free FIFO in time to avoid a situation wherein one module has run out of empty message frames for processing. It is thereby possible to assure a continuous supply empty message frames for further processing. The method according to the present invention also addresses the particular problem of deadlock which is apt to occur in message passing interfaces between modules, such as between individual I/O drivers in an operating system.

While the foregoing detailed description has described several embodiments of the present invention, it is to be understood that the above description is illustrative only and not limiting of the disclosed invention. Those of skill in this art will undoubtedly make various modifications to the present invention, and all such modifications should to be deemed to fall within the spirit of the present invention. Thus, the invention is to be limited only by the claims as set forth below.

What is claimed:

1. In a message passing interface between a requesting module and a receiving module, each module having access to two queues in the message passing interface, each queue having a Work FIFO for containing messages frames to be processed and a Free FIFO for containing empty message frames, a method of processing messages comprises the steps of:

monitoring a number of free messages in the Free FIFO of the receiving module;

determining when the number of free messages is below a selectively determined early warning level;

alerting the receiving module when the number of free messages is below the early warning level;

sending, by the receiving module, an early warning level signal to the requesting module;

posting additional free messages to the Free FIFO of the receiving module; and processing, by the receiving module, of messages from the work FIFO of the receiving module, whereby the requesting module is assured of a continuous supply of free messages in the Free FIFO of the receiving module, and the receiving module is assured of having at least one of free messages in the Free FIFO of the receiving module to send the early warning signal.

2. The method of claim 1, wherein a value of the selectively determined early warning level is determined during initialization of the message interface, to a value between zero and a number of free messages to be posted on the free FIFO of the receiving module.

3. The method of claim 2, further comprising a step of adjusting the selectively determined early warning level as the additional free messages are posted on the Free FIFO of the receiving module.

4. The method of claim 1, further comprising a step of adjusting the selectively determined early warning level after the additional free messages are posted on the Free FIFO of the receiving module.

5. In a message passing interface between a requesting module and a receiving module, each module having access to two queues in the message passing interfaces each queue having a Work FIFO for containing message frames to be processed and a Free FIFO for containing free messages, a method of processing messages comprises the steps of:

monitoring a number of free messages in the Free FIFO of the receiving module;

sending an early warning level signal to the requesting module when the number of free messages in the Free FIFO of the receiving module is below an early warning level; and posting additional free messages to the Free FIFO of the receiving module, whereby the receiving module has at least one free message to send the early warning level signal to the requesting module, and the receiving module uses the additional free messages to process messages from the Work FIFO of the receiving module.

6. The method of claim 5, wherein a value of the selectively determined early warning level is determined during initialization of the message interface, to a value between zero and a number of free messages to be posted on the Free FIFO of the receiving module.

7. The method of claim 6, further comprising a step of adjusting the selectively determined early warning level as the additional free messages are posted on the Free FIFO of the receiving module.

8. The method of claim 5, further comprising a step of adjusting the selectively determined early warning level after the additional free messages are posted on the Free FIFO of the receiving module.

9. A method of passing messages between a requesting module and a receiving module, each module having access to two queues in the message passing interface, each queue having a Work FIFO for containing message frames to be processed and a Free FIFO for containing free messages, comprises the steps of:

detecting a number of free messages stored in the Free FIFO of the receiving module;

sending an early warning level signal to the receiving module when the detected number falls below an early warning level, the early warning level being selected to be greater than a FIFO empty level and less than a FIFO full level;

utilizing one remaining free message in the Free FIFO of the receiving module to alert the requesting module of a low free message status; and posting additional free messages to the Free FIFO of the receiving module, whereby the receiving module has free messages available to continue processing messages from the Work FIFO of the receiving module.

10. The method of claim 9, wherein a value of the selectively determined early warning level is determined during initialization of the message interface.

11. The method of claim 9, further comprising a step of adjusting a value of the early warning level after the additional free messages are posted on the Free FIFO of the receiving module.

* * * * *